May 8, 1962 J. A. CORLEY 3,033,626
TWIN-PISTON ELEMENT
Filed July 3, 1959
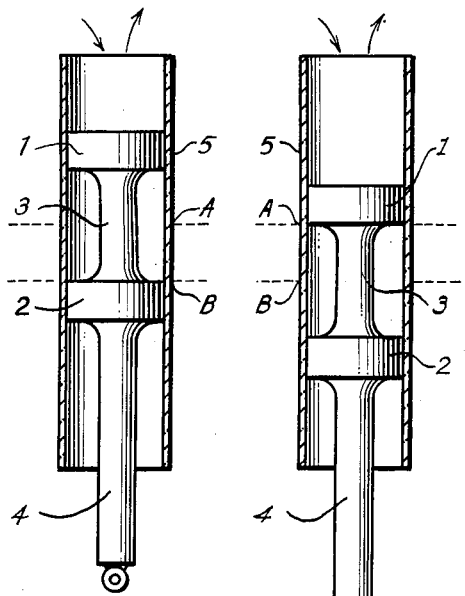
FIG.1.
FIG.2.
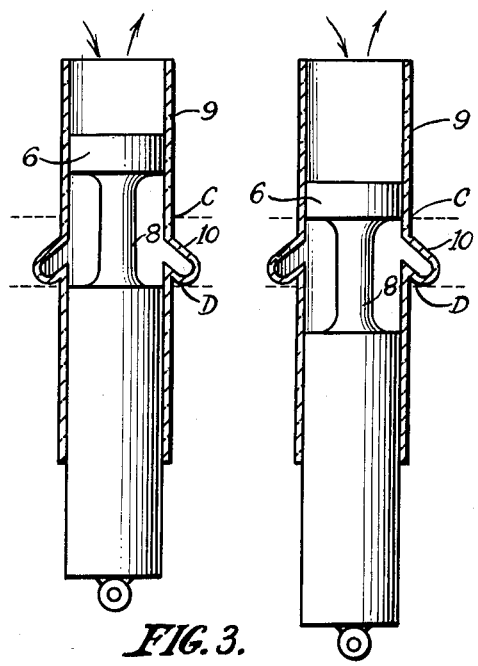
FIG.3.
FIG.4.
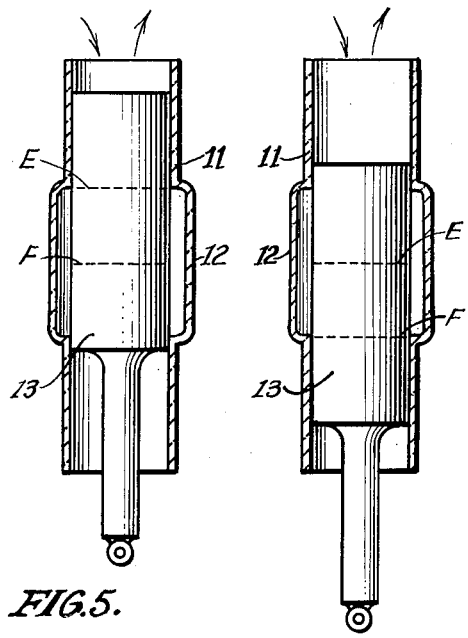
FIG.5.
FIG.6.
JOSEPH A. CORLEY
INVENTOR.
BY Edward A. Conroy, Jr.
ATTORNEY ated May 8, 1962

3,033,626
TWIN-PISTON ELEMENT
Joseph A. Corley, Sloatsburg, N.Y., assignor to American Cyanamid Company, New York, N.Y., a corporation of Maine
Filed July 3, 1959, Ser. No. 824,872
1 Claim. (Cl. 309—4)

This invention relates to a novel twin-piston element for use with sterile liquid filling machines which supply repeated, measured volumes of a liquid by means of the action of a reciprocating piston.

The measuring and dispensing of liquid material, especially viscous material, under sterile conditions has presented numerous difficulties to the pharmaceutical industry. Over a period of many years, various attempts were made to obtain a device which would be relatively trouble-free, easily sterilizable, and capable of delivering repeated, measured volumes of various liquids of a wide range of viscosities. The reciprocating piston type of liquid filling machine which was finally adopted still presents the problems, however, of contamination and of "freezing" of the piston in the measuring cylinder.

The reciprocating piston type of liquid filling machine is constructed as follows. A vertical measuring cylinder, closed at its upper end save for a T-connection, is fitted with a piston having a connecting rod passing from its lower end to a crank shaft on a drive wheel in the usual manner. One horizontal arm of the T-connection constitutes an inlet tube for filling the cylinder above the piston with liquid on the down-stroke of the piston, whereas the other horizontal arm of the T-connection constitutes an outlet tube whereby the liquid above the piston is discharged from the cylinder on the up-stroke of the piston. The inlet arm of the T-connection terminates in the bulk container, whereas the outlet arm of the T-connection terminates in the injection nozzle for filling the containers.

The piston employed in the reciprocating piston type of liquid filling machine described above consists of a uniform cylinder, closed at both ends, which is fitted into the measuring cylinder of the liquid filling machine. When liquids used for medicinal purposes are dispensed by such a device, two problems are encountered. These are: maintenance of essentially continuous operation, and maintenance of aseptic conditions. The filling operation is frequently interrupted when the reciprocating piston "freezes," that is, ceases to move freely in and out of the measuring cylinder. This often results in damage to the liquid filling machine, and also results in costly production line shutdowns. This "freezing" of the piston is due to the fact that some of the liquid being dispensed finds its way between the piston and the inner wall of the measuring cylinder. The evaporation of the solvent from this liquid during those times when the movement of the piston exposes its lower portion to the air results in a build-up of the solute on the lower portion of the piston. This "freezing" phenomenon caused by solute build-up on the lower portion of the piston is especially noticeable when the liquid being dispensed is employed as the sole lubricant for the piston, and/or is quick-drying, such as sera, sugar solutions and the like. Moreover, aseptic conditions are difficult to maintain when equipment fails for this reason. Furthermore, that part of the liquid being dispensed which acts as piston lubricant may become contaminated by exposure to the air during those times when the lower portion of the piston is outside the measuring cylinder. Subsequent bacterial contamination of the liquid being dispensed is known to be possible and is due to the transfer of contaminants from the surface of the piston to the wall of the measuring cylinder and thence to the liquid being dispensed.

Various attempts have been made to eliminate this build-up of solute on the lower portion of the piston. Non-drying lubricants such as glycerol have been applied to the surface of the piston to accomplish this purpose. However, adulteration of the liquid being dispensed by the lubricant clearly occurs and the possibility of bacterial contamination is not eliminated by such a procedure.

It has now been found that these problems inherent in the reciprocating piston type of liquid filling machine of the prior art are solved by the novel twin-piston element of the present invention. An essential concomitant feature of the novel twin-piston element of the present invention is a so-called "dead" section between portions of a cylinder which dead section experiences no piston to cylinder wall contact at all.

The novel twin-piston element of the present invention is illustrated in the accompanying drawings, wherein like reference numerals indicate corresponding parts in the several views, and in which:

FIGURE 1 is a vertical cross-sectional view taken through the axis of rotation of a preferred embodiment of the present invention wherein the piston is shown at maximum up-stroke;

FIGURE 2 is a vertical cross-sectional view taken through the axis of rotation of the embodiment of FIGURE 1 wherein the piston is shown at maximum down-stroke;

FIGURE 3 is a vertical cross-sectional view taken through the axis of rotation of another embodiment of the present invention wherein the piston is shown at maximum up-stroke;

FIGURE 4 is a vertical cross-sectional view taken through the axis of rotation of the embodiment of FIGURE 3 wherein the piston is shown at maximum down-stroke;

FIGURE 5 is a vertical cross-sectional view taken through the axis of rotation of an alternate embodiment of the present invention wherein the piston is shown at maximum up-stroke;

FIGURE 6 is a vertical cross-sectional view taken through the axis of rotation of the embodiment of FIGURE 5 wherein the piston is shown at maximum down-stroke.

FIGURE 1 and FIGURE 2 show an upper piston 1 and a lower piston 2 rigidly connected by the rod 3. The lower piston 2 has rigidly connected thereto piston rod 4 whose lower end is adapted for attachment to a connecting rod from a drive wheel. The resulting twin-piston element is closely fitted in the measuring cylinder 5. The reciprocating traverse of the twin-piston element is so adjusted that the portion of cylinder 5 between point A and point B is not traversed by either piston 1 or piston 2.

FIGURE 3 and FIGURE 4 show an upper piston 6 and a lower piston 7 rigidly connected by the rod 8. The lower end of piston 7 is adapted for attachment to a connecting rod from a drive wheel. The resulting twin-piston element is closely fitted in the measuring cylinder 9. The reciprocating traverse of the twin-piston element is so adjusted that the portion of cylinder wall 9 between point C and point D is not traversed by either piston 6 or piston 7. The measuring cylinder 9 is provided with a uniform bulge or protuberant collar 10, between point C and point D, so constructed as to act as a reservoir for that part of the liquid being dipensed which finds its way between piston 6 and the inner wall of cylinder 9 and flows down the inner wall of cylinder 9 into the protuberant collar 10.

FIGURE 5 and FIGURE 6 show a measuring cylinder 11 provided with a uniform bulge or protuberant collar 12 whose diameter is sensibly greater than the diameter of cylinder 11, and whose axis of rotation is identical with the axis of rotation of the cylinder 11. Within the cylinder 11 is closely fitted the single piston 13 whose lower end is adapted for attachment to a connecting rod from a drive wheel. The reciprocating traverse of the single piston 13 is so adjusted that the portion of piston 13 between point E and point F at no time passes beyond the upper or lower extremities of the uniform bulge 12.

The essential feature of the twin-piston element of the present invention resides in a combination of: (1) a pair of co-axial piston portions, or piston means, pistons of equal diameter connected at a fixed distance from each other by means having a smaller diameter than the diameter of said pistons, and (2) a stroke of the twin-piston element in the measuring cylinder which is shorter than the fixed distance between the pair of co-axial pistons. The result of such combination is that a portion of the measuring cylinder wall is never traversed by any part of the twin-piston element. For example, in FIGURE 1 and FIGURE 2, the transverse section of cylinder 5 between points A and B is never traversed by any part of the twin-piston element. Similarly, in FIGURE 3 and FIGURE 4 the transverse section of cylinder 9 between points C and D is never traversed by any part of the twin-piston element.

The present invention eliminates the problems of "freezing" and contamination inherent in the construction of the reciprocating piston type of liquid filling machine of the prior art. The problem of "freezing" is eliminated by reason of the fact that the space between the twin pistons within the measuring cylinder is essentially a closed system. As the liquid being dispensed finds its way between the upper piston and the inner wall of the measuring cylinder, the following occurs. On the down-stroke of the twin-piston element, the liquid is carried down to the point A in cylinder 5 of FIGURE 2, and to the point C in cylinder 9 of FIGURE 4. On the up-stroke of the twin-piston element, the liquid forms a film on the inner wall of the transverse sections of the measuring cylinders between the lower shoulder of upper piston 1 and the point A in cylinder 5 of FIGURE 1, and between the lower shoulder of upper piston 6 and the point C in cylinder 9 of FIGURE 3. As this occurs, there is evaporation of the solvent from the film of the liquid being dispensed. However, since such evaporation is taking place in a closed system, the atmosphere present in the closed system rapidly becomes saturated with solvent vapor, thereby preventing further evaporation of the solvent from the film of the liquid being dispensed. Hence, there is no solute build-up on the inner wall of the measuring cylinders between the lower shoulder of upper piston 1 and the point A in cylinder 5 of FIGURE 1, and between the lower shoulder of upper piston 6 and the point C in cylinder 9 of FIGURE 3. Thus, the problem of "freezing" is completely eliminated by the twin-piston element of the present invention. The problem of contamination is eliminated by reason of the non-traversed section, or so-called "dead" area, within the measuring cylinder. Where the liquid being dispensed has a high viscosity, it is carried by the upper piston but very little below the point A in cylinder 5 of FIGURE 2, and the point C in cylinder 9 of FIGURE 4. The lubricant being used on the lower piston is carried above neither point B in cylinder 5 of FIGURE 1, nor point D in cylinder 9 of FIGURE 3, by reason of the force of gravity preventing upward flow of such lubricant. Thus, there is no contact between the liquid being dispensed and the lower piston lubricant in the non-traversed section or "dead" area. Without such contact, there can be neither mechanical adulteration nor bacterial contamination of the liquid being dispensed.

Where the liquid being dispensed has a low viscosity, it is conceivable that, after the liquid finds its way between the upper piston and the inner wall of the measuring cylinder, it may flow downward across the non-traversed section, make contact with the lower piston lubricant, and become contaminated. In such case, resort is had to measuring cylinder 9 as shown in FIGURE 3 and FIGURE 4. As the liquid flows downward across the non-traversed section in cylinder 9 between the point C and the point D, it flows into the protuberant collar 10 as into a reservoir, thus preventing contact between the lower piston lubricant and the liquid being dispensed. If the liquid being dispensed has a particularly low viscosity, it may be necessary to deepen the reservoir section of the protuberant collar 10 so as to accommodate more of the liquid being dispensed, thus preventing contact between the lower piston lubricant and the liquid being dispensed.

The essential feature of the twin-piston element of the present invention is also attained by utilizing a single piston 13 fitted in a measuring cylinder 11 having a uniform bulge 12 as shown in FIGURE 5 and FIGURE 6. In such case, it is only necessary that the length of the uniform bulge 12 be sensibly greater than the length of traverse of piston 13 from maximum up-stroke to maximum down-stroke. There is thus obtained the effect of a pair of co-axial pistons operating in two non-contiguous portions of a cylinder by reason of the "dead" area of the piston 13. As shown in FIGURE 5 and FIGURE 6, the transverse section of piston 13 between point E and point F, which defines the so-called "dead" area of piston 13, at no time passes out of the uniform bulge 12 of the cylinder 11. "Freezing" of piston 13 in cylinder 11 is prevented by reason of the fact that any solvent evaporating from that portion of the liquid being dispensed which finds its way between piston 13 and the inner wall of that part of cylinder 11 above the uniform bulge 12 does so in a closed system. Saturation of the atmosphere present in the closed system within the uniform bulge 12 quickly occurs, and thus there is no further evaporation of solvent and hence no solute build-up on that part of piston 13 above point E. Furthermore, there is no mechanical adulteration or bacterial contamination of the liquid being dispensed, since ordinarily it travels but little below the point E on piston 13, whereas the lubricant used on that part of piston 13 below point F does not flow above point F by reason of the force of gravity.

It is an advantage of the present invention that both the measuring cylinders and the novel twin-piston elements may be fashioned of glass, or of brass, or of any convenient material including plastic materials. It is only necessary that they be fabricated from materials having: sufficient structural strength to function in a reciprocating piston type of liquid filling machine; a composition capable of allowing, when lubricated, smooth reciprocating motion of the piston in the measuring cylinder; a composition capable of withstanding the deteriorative action of the liquid being dispensed, and of the lubricant used to facilitate operations; and a composition capable of withstanding sterilization operations.

Whereas the liquid being dispensed serves to lubricate the upper piston of the twin-piston element, as shown in FIGURE 1 and FIGURE 2 and also FIGURE 3 and FIGURE 4, or the upper part of the single piston element, as shown in FIGURE 5 and FIGURE 6, various lubricants may be used to lubricate the lower piston of the twin-piston elements or the lower part of the single piston element. However, glycerine is the preferred lubricant, particularly when the piston and cylinder are fashioned of glass.

The upper and lower pistons of the novel twin-piston element of the present invention may be constructed of different materials or of the same material. If constructed of the same material, then the rod connecting the upper and lower pistons may be constructed of a different material or the same material. The pistons and rod may be constructed integrally as a single unit, or they may be constructed separately and connected together by any convenient means. In the construction of the novel twin-piston element, it is essential that the diameter of the rod connecting the upper and lower pistons is sufficiently less than the diameter of the pistons so that the distance from the cylinder wall to the rod is sufficiently great to break capillarity. This will be a function of the physical characteristics of the liquid being dispensed, and of the lubricant used, and the material or materials from which the rod and the measuring cylinder are fabricated.

A readily constructed embodiment of the present invention utilizes for a measuring cylinder a glass syringe barrel with both ends cut off as in the nature of cylinder 5 shown in FIGURE 1 and FIGURE 2. The syringe piston is provided with a recessed portion as in the nature of the twin-piston element shown in FIGURE 3 and FIGURE 4, which may be etched, ground or otherwise fabricated to the desired depth. This twin-piston element is inserted into the syringe barrel a T-connection is fitted to the upper open end of the syringe barrel, and the lower end of the twin-piston element is attached to a connecting rod from a drive wheel. All of these parts are so dimensioned as to provide a non-traversed section of the syringe barrel between the pistons during operation. Such an embodiment of the present invention was incorporated in a liquid filling machine and utilized for the dispensing of tetanus antitoxin. That part of the twin-piston element below the recessed portion was lubricated with clean glycerine only once, at the time of set up. The twin-piston element was operated at 40 strokes per minute for 4,000 doses, then restarted on the following day and run for an additional 12,000 doses without mishap. The twin-piston element showed no sign of wear or friction, and the critical non-traversed section of the syringe barrel between the pistons remained dry. There was no mixing of glycerine with the product.

I claim:

In a sterile, displacement piston, type of liquid filling machine for filling of containers serially, in combination: a comparatively long cylinder, a one piece co-axial piston, fitting liquid-tight directly in and reciprocable in said cylinder, with end portions of each of said piston and cylinder in contact, an interruption in the contacting surfaces of said piston and said cylinder between the end portions thereof, and mechanical means for reciprocating said piston, the length of such reciprocation being such that the areas of the cylinder wall contacted by said end piston portions during reciprocation are non-contiguous, thus forming a sealed sterile volume between said end piston portions and cylinder wall; whereby any surface contamination that finds its way between one piston portion and its cooperating area of cylinder wall is not transferred to the other piston portion and its cooperating area of cylinder wall, and means to supply a liquid from a source of supply.

References Cited in the file of this patent

UNITED STATES PATENTS

| | | |
|---|---|---|
| 788,059 | McElroy | Apr. 25, 1905 |
| 899,728 | Graham | Sept. 29, 1908 |